US012596442B2

(12) United States Patent
Kehoe et al.

(10) Patent No.: US 12,596,442 B2
(45) Date of Patent: Apr. 7, 2026

(54) DOCK TRACKING FOR AN AR/VR DEVICE

(71) Applicant: Logitech Europe S.A., Lausanne (CH)

(72) Inventors: Aidan Kehoe, County Cork (IE);
Olivier Guédat, Vufflens-la-Ville (CH);
Mario Gutierrez, Renens (CH);
Ahmad Abou Daher, Ecublens (CH);
Jean-Michel Chardon, Vufflens-la-Ville (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/818,421

(22) Filed: Aug. 28, 2024

(65) Prior Publication Data

US 2025/0377740 A1    Dec. 11, 2025

Related U.S. Application Data

(60) Provisional application No. 63/657,314, filed on Jun. 7, 2024.

(51) Int. Cl.
*G06F 3/0354* (2013.01)
*G06F 3/01* (2006.01)

(52) U.S. Cl.
CPC .......... *G06F 3/03545* (2013.01); *G06F 3/011* (2013.01)

(58) Field of Classification Search
CPC .... G06F 3/011; G06F 3/03545; G06T 19/006; G02B 27/017; G02B 2027/0178
See application file for complete search history.

(56) References Cited

U.S. PATENT DOCUMENTS

| | | | | |
|---|---|---|---|---|
| 11,835,727 | B2 * | 12/2023 | Kondo ................. | G06V 40/19 |
| 2017/0308177 | A1 | 10/2017 | Marshall et al. | |
| 2020/0042157 | A1 * | 2/2020 | Robinson .......... | G02B 27/0172 |
| 2020/0310561 | A1 * | 10/2020 | Connellan .......... | G06F 3/03545 |

FOREIGN PATENT DOCUMENTS

| | | |
|---|---|---|
| CN | 103150037 A | 6/2013 |
| CN | 106293136 A | 1/2017 |
| CN | 107643838 A | 1/2018 |
| CN | 115328336 A | 11/2022 |
| EP | 2618241 A1 | 7/2013 |
| JP | 2015022823 A | 2/2015 |

OTHER PUBLICATIONS

PCT/CN2024/098309, "International Search Report and Written Opinion", Dec. 23, 2024, 9 pages.

* cited by examiner

*Primary Examiner* — Koosha Sharifi-Tafreshi

(74) *Attorney, Agent, or Firm* — Kilpatrick Townsend & Stockton LLP

(57) ABSTRACT

A method for tracking a physical object in a virtual environment. The physical object is tracked and a rendering of the physical object in the virtual environment is displayed. The placement of the physical object in a storage location where it is no longer being moved is detected. The tracking of the physical object is stopped, while continuing to display the physical object at the location in the virtual environment.

17 Claims, 7 Drawing Sheets

DOCK TRACKING FOR AN AR/VR DEVICE

CROSS REFERENCE PARAGRAPH FOR PRIORITY

This application is a non-provisional application and claims the benefit and priority of U.S. Provisional Application No. 63/657,314, filed on Jun. 7, 2024, and titled "DOCK TRACKING FOR AN AR/VR DEVICE," which is hereby incorporated by reference in its entirety for all purposes.

BACKGROUND

Virtual, mixed, or augmented reality can be associated with a variety of applications that comprise immersive, highly visual, computer-simulated environments. These environments, commonly referred to as augmented-reality (AR)/virtual-reality (VR) environments, can simulate a physical presence of a user in a real or imagined world. The computer simulation of these environments can include computer rendered images, which can be presented by means of a graphical display. The display can be arranged as a head mounted display (HMD) that may encompass all or part of a user's field of view.

A user can interface with the computer-simulated environment by means of a user interface device or peripheral device. A common controller type in many contemporary AR/VR systems is the pistol grip controller, which can typically operate with three or six degrees-of-freedom (DOF) of tracked movement, depending on the particular system. When immersed in a computer-simulated AR/VR environment, the user may perform complex operations associated with the interface device, including simulated movement, object interaction and manipulation, and more. In addition, a user may want to use a stylus to do drawing in the AR/VR environment. The user may also want to put on earbuds or another audio headset, or operate a keyboard, mouse, gamepad, video game steering wheel, etc. Locating all these devices while in an immersive environment is problematic. They could be all tracked and displayed, but that would consume valuable computing power and time. Most Head-Mounted Display (HMD) headsets are also limited in the number of devices they can track. In addition, the user will often want to put the various control devices in docking or charging stations when not in use, adding the need to track the location of the docking stations. Thus, there is need for improvement in tracking interface devices when operating within virtualized environments.

Unless otherwise indicated herein, the materials described in this section of the specification are not prior art to the claims in this application and are not admitted to be prior art by inclusion in this section.

BRIEF SUMMARY OF THE INVENTION

Embodiments provide a method for tracking a physical object in a virtual environment. The physical object is tracked and a rendering of the physical object in the virtual environment is displayed. The placement of the physical object in a storage location where it is no longer being moved is detected. The tracking of the physical object is stopped, while continuing to display the physical object at the location in the virtual environment.

In certain embodiments the storage location provides information to the physical object (e.g., about itself and/or associated objects). The physical object transmits the information to a head-mounted display (HMD). The HMD displays a rendering based on the information (e.g., a rendering of the storage location, which may be, for example, a docking station or charger or cradle). Since the location of the physical object is tracked, the location of the storage location relative to the physical object will be known, enabling the rendering of it at the correct location, showing the docked physical object.

In certain embodiments the physical object is a peripheral device, such as a stylus and a controller. In some embodiments the storage location is a desktop or a docking station. A memory stores information about the docking station and a processor causes the display of a rendering of the docking station at the storage location. Information about a condition of the physical object (e.g., charge status) is received and the processor causes the display of an indicator of the information on the rendering of the docking station.

In other embodiments a spatial anchor is provided in the virtual environment, the spatial anchor corresponding to the location of a physical element (e.g., a desktop). The storage location is linked to the physical element (e.g., a docking station on a desktop). By tracking the physical object to the storage location, the location of the linked physical element can be determined. This can be used to correct the coordinates of the spatial anchor based on the storage location and its link to the physical element.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

Aspects, features and advantages of embodiments of the present disclosure will become apparent from the following description of embodiments in reference to the appended drawings.

DETAILED DESCRIPTION OF THE INVENTION

Figure 1:
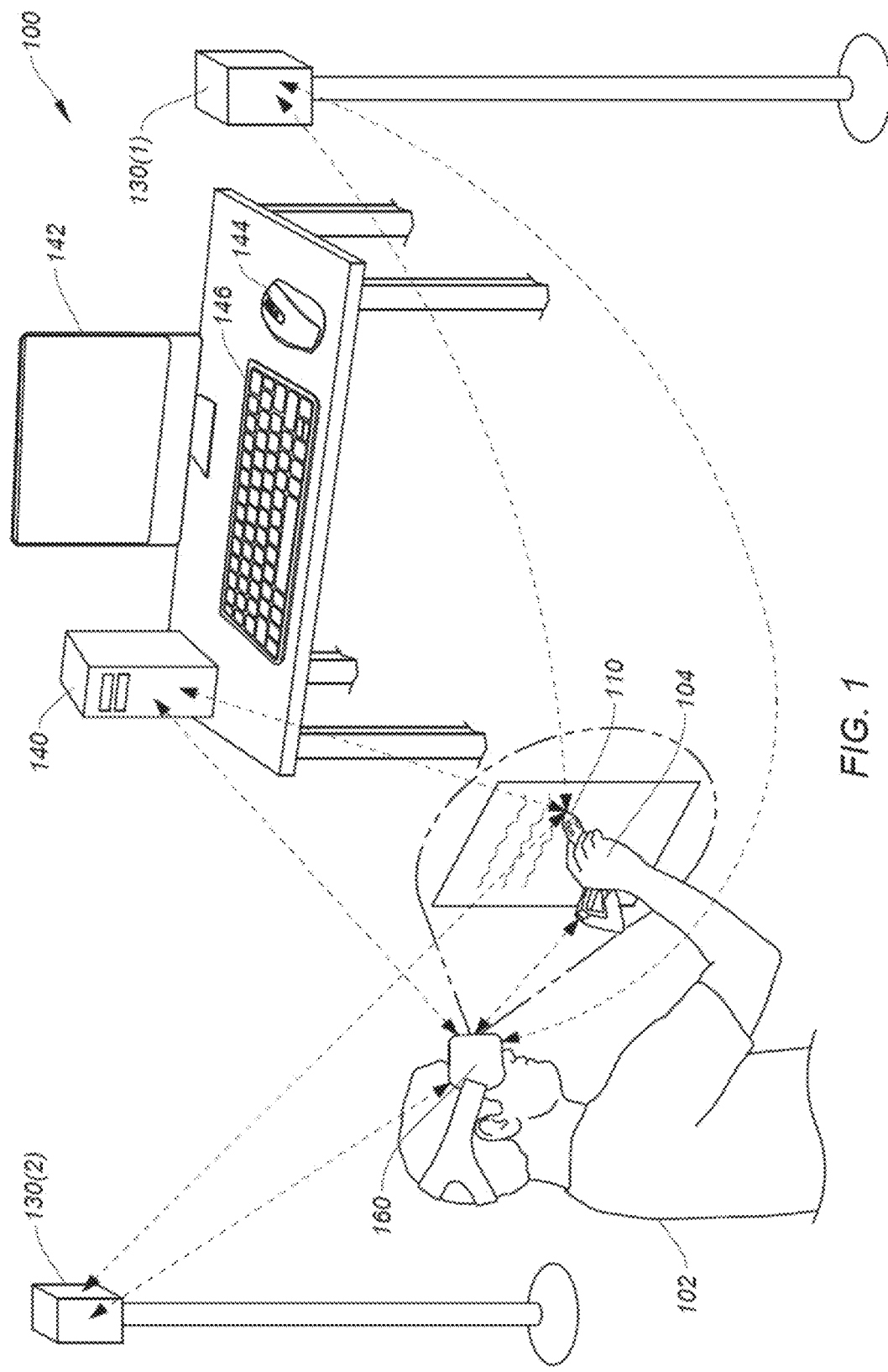
FIG. 1 shows a user operating a stylus device in an augmented/virtual reality environment, according to certain embodiments.

Aspects of the present disclosure relate generally to tracking objects in an immersive environment. More specifically, embodiments of this invention are generally directed to control devices configured to operate in AR/VR-based systems. More specifically, some embodiments relate to turning off tracking of a tracked device when docked, and remembering and rendering the location of the docking station from the last tracked location of the tracked device.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

To provide a high level, broad understanding of some aspects of the present disclosure, a non-limiting summary of certain embodiments are presented here. In many conventional AR/VR systems currently in the market, pistol grip-type controls are commonplace. However, in addition to the controller, or in place of it, a stylus may be used for drawing in an AR/VR environment. Additionally, other devices may be tracked, such as earbuds, a gamepad etc. The following description will focus on tracking of a stylus as an example, but the methods and apparatus described are applicable to tracking any peripheral device or other tracked object.

In certain exemplary embodiments, the input device can be a stylus device configured for use in an augmented/virtual (AR/VR) reality environment. One or more processors and a communications module configured to establish a wireless electronic communication between the stylus device and at least one host computing device can be disposed in the housing. An example stylus is shown in U.S. Pat. No. 10,719,143. A number of emitters or sensors can be configured on some or all of the stylus surfaces, which can facilitate a tracking of the stylus device in three-dimensional space within the AR/VR environment. The use of emitters (e.g., infra-red LEDs) and/or sensors (e.g., infra-red detectors) may depend on the type of tracking infrastructure used by the AR/VR system. Alternately, other tracking systems can be used, such as acoustic tracking, wireless tracking, inertial tracking, magnetic tracking, etc.

Typical AR/VR System Environment

Some basic elements of a typical AR/VR system include a device to immerse the user in an AR/VR environment (e.g., an HMD, holographic emitter, audio system, haptic feedback system, or the like, all referred to herein as an HMD), one or more input devices (e.g., a stylus, remote control, joystick, pistol grip controller, etc.) that allow the user to interface with the AR/VR environment, and a tracking system to track the location of the user, which may include tracking the location of the HMD, the input device, and/or other devices (e.g., wearables, etc.). One or more computing devices (e.g., desktop computer, laptop computers, gaming platforms, entertainment/media systems, cloud-based systems, combinations thereof, etc.) can be used to communicate with and control the various input and output elements.

There are a number of different types of tracking systems that can be used to track the location/orientation of an input device, according to certain embodiments. "Outside in" systems typically use external devices to track the headset (e.g., HMD) and accessories (e.g., stylus device). The external tracking devices (e.g., cameras, IR sensors, etc.) may be placed around the room and can be directed generally toward the HMD and/or input device and can be configured to determine the position and orientation of the HMD and input device in relations to the AR/VR environment. Outside-in systems can have very latency and may be very accurate, which can be further enhanced be incorporating additional tracking devices. Some downsides associated with outside-in systems include the need to remain in a set field of view, as well as the problem of occlusion, as outside-in tracking tends to rely on line-of-sight tracking. Thus, outside-in systems typically need 360 degrees of tracking capability or risk losing a tracked location and orientation of the HMD and input device when the user turns or moves in certain positions or locations.

In "inside-out" systems, a camera or sensor array is placed on the device being tracked (e.g., HMD, stylus device) and determines how its position and/or orientation is changing in relation to the AR/VR environment. As the tracked device moves, the new tracked coordinates are updated in real-time. In some cases, inside-out tracking can be supplemented with fiducial markers to improve position/orientation tracking. One advantage is that a user can have greater freedom in movement within the virtual world without requiring sensors to be placed around the room. One disadvantage is that all computations occur within the tracked system itself, such as by the HMD, which can create performance limitations. One of ordinary skill in the art with the benefit of this disclosure would understand the many variations, modifications, and alternative embodiments of the various AR/VR systems that are available and how embodiments of the input devices (e.g., stylus devices) described herein may operate in these various systems. One such embodiment is shown and described below with respect to FIG. 1.

FIG. 1 shows a user 102 operating a stylus device 110 in an "outside-in" AR/VR environment 100, according to certain embodiments. Outside-in tracking uses sensors or cameras external to the HMD or other controller. Markers or sensors are attached to the user or the user's VR devices. These markers or sensors are tracked by the external sensors or cameras. The external sensors also provide a reference point for calculating the user's position and movement. Triangulation can be used with data from multiple sensors to determine the user's position and orientation in 3D space.

AR/VR environment 100 can include a computer 140 and any number of peripherals, which may include a display device 142, computer mouse 144, keyboard 146, or other input/output device. User 102 is shown wearing a head-mounted display 160 and using stylus 110 to draft a letter on a virtual parchment 165. The stylus can be in wireless electronic communication with one or more external sensors 130 (1, 2, . . . n), HMD 160, computer 140, or any combination thereof. Similarly, HMD 160 can be in wireless electronic communication with one or more external sensors 130 (1, 2, . . . n), computer 140, stylus 110, or any combination thereof.

As shown in FIG. 1, user 102 can manipulate stylus 110 with high precision due to its exceptional ergonomic properties that allow extended use and reduced fatigue, which is further described below with respect to FIGS. 6A-6C. An outside-in system, as shown, may include emitters (e.g., IR LEDs) configured on stylus 110, which is further described below with respect to FIG. 7. Alternatively or additionally, stylus 110 may include a plurality of sensors for inside-out tracking, which may perform movement and orientation calculations locally (e.g., by processor(s) 210) or externally (e.g., by HMD 160, computer 140, etc.). One of ordinary skill in the art with the benefit of this disclosure would understand the many variations, modifications, and alternative embodiments thereof for tracking stylus 110 with the various types of AR/VR tracking systems in use.

An alternative to the "outside-in tracking" shown in FIG. 1 is "inside-out tracking." Inside-out tracking uses sensors embedded within the HMD or controllers. These sensors can be, for example, cameras or infrared sensors. They can capture the environment around the user. Inside-out tracking algorithms analyze the captured data to determine the user's position and movement relative to their surroundings. In order to interpret the data, computer vision techniques, simultaneous localization, and/or Simultaneous Localization And Mapping (SLAM), or other methods can be used.

Simplified System Embodiment for AR/VR Input Device

Figure 2:
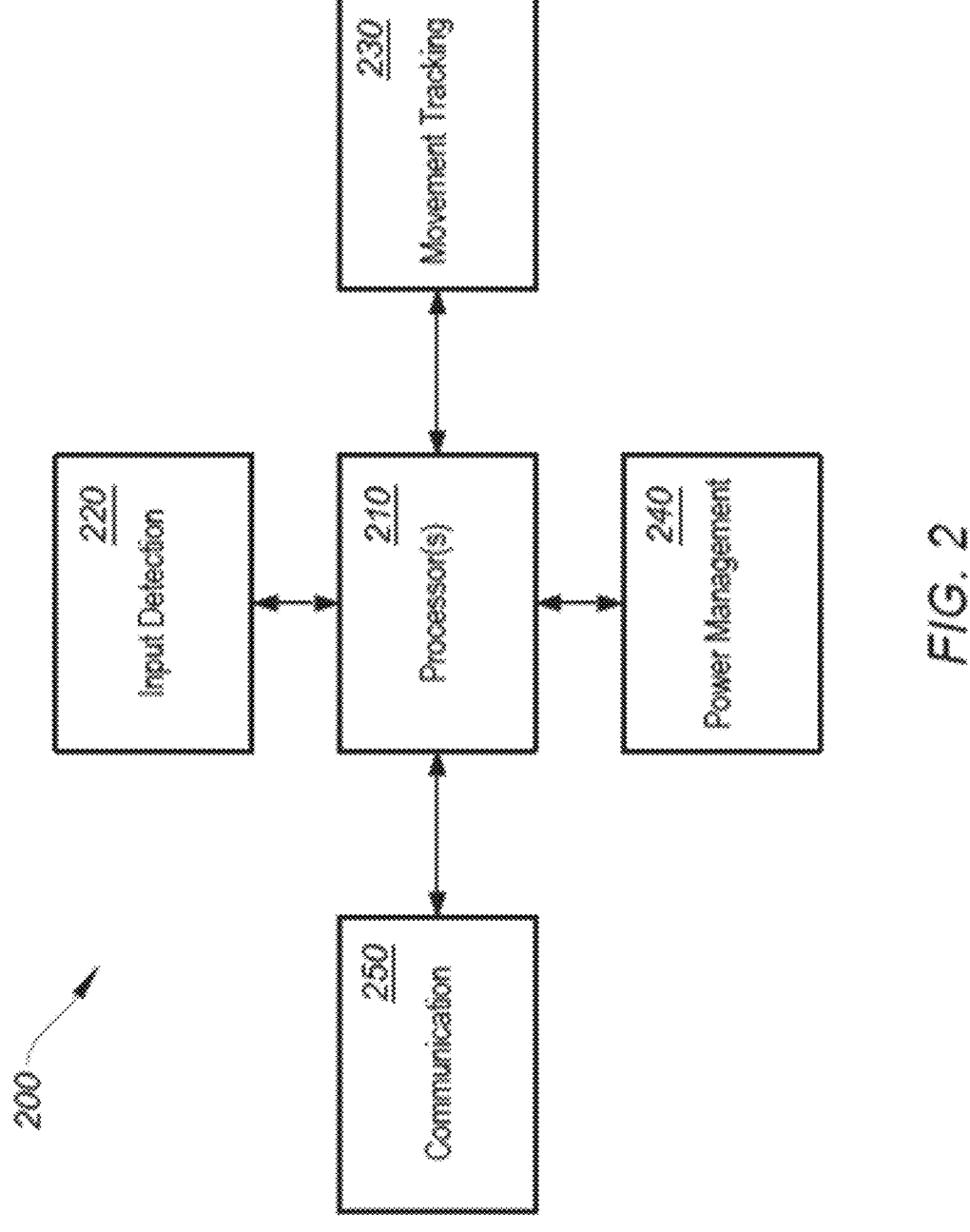
FIG. 2 shows a simplified block diagram of an AR/VR system, according to certain embodiments.

FIG. 2 shows a simplified system block diagram ("system") 200 of an input device 110, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (µCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 200. For example, communications block 250 may include a local processor to control communication with computer 140 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation (e.g., controls 416 of FIG. 4A, buttons, triggers, etc.), scroll wheel and/or trackball manipulation (e.g., rotation detection), sliders, switches, touch sensors (e.g., one and/or two-dimensional touch pads), force sensors, and the like. The activated input element (e.g., button press) may generate a corresponding control signal (e.g., human interface device (HID) signal) to control a computing device (e.g., computer 160) communicatively coupled to input device 110 (e.g., instantiating a "grab" function in the AR/VR environment). Alternatively, the functions of input detection block 220 can be subsumed by processor 210, or in combination therewith.

In some embodiments, input detection block 220 can detect a touch or touch gesture on one or more touch sensitive surfaces, as described above. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 110 may or may not utilize touch detection or touch sensing elements.

In some aspects, input detection block 220 can control the operating of haptic devices implemented on an input device. For example, input signals generated by haptic devices can be received and processed by input detection block 220. For example, an input signal can be an input voltage, charge, or current generated by a piezoelectric device in response to receiving a force (e.g., user touch) on its surface. In some embodiments, input detection block 220 may control an output of one or more haptic devices on input device 14. For example, certain parameters that define characteristics of the haptic feedback can be controlled by input detection block 220. Some input and output parameters can include a press threshold, release threshold, feedback sharpness, feedback force amplitude, feedback duration, feedback frequency, over voltage (e.g., using different voltage levels at different stages), and feedback modulation over time. Alternatively, haptic input/output control can be performed by processor 210 or in combination therewith.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Movement tracking block 230 can be configured to track or enable tracking of a movement of input device 110 in three dimensions in an AR/VR environment. For outside-in tracking systems, movement tracking block 230 may include a plurality of emitters (e.g., IR LEDs) disposed on input device, as shown for example in FIG. 7, fiducial markings, or other tracking implements, to allow the outside-in system to track the input device's position, orientation, and movement within the AR/VR environment. For inside-out tracking systems, movement tracking block 230 can include a plurality of cameras, IR sensors, or other tracking implements to allow the inside-out system track the input device's position, orientation, and movement within the AR/VR environment. Preferably, the tracking implements (also referred to as "tracking elements") in either case are configured such that at least four reference points on the input device can be determined at any point in time to ensure accurate tracking. Some embodiments may include emitters and sensors, fiducial markings, or other combination of multiple tracking implements such that the input device may be used "out of the box" in an inside-out-type tracking system or an outside-in-type tracking system. Such embodiments can have a more universal, system-agnostic application across multiple system platforms.

In certain embodiments, an inertial measurement unit (IMU) can be used for supplementing movement detection. IMUs may be comprised of one or more accelerometers, gyroscopes, or the like. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine a velocity, physical orientation, and acceleration of input device 110 in 3D space In some embodiments, gyroscope(s) can be used in lieu of or in conjunction with accelerometer(s) to determine movement or input device orientation in 3D space (e.g., as applied in an VR/AR environment). Any suitable type of IMU and any number of IMUs can be incorporated into input device 110, as would be understood by one of ordinary skill in the art.

Power management block 240 can be configured to manage power distribution, recharging, power efficiency, and the like, for input device 110. In some embodiments, power management block 240 can include a battery (not shown), a USB-based recharging system for the battery (not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between input device 110 and HMD 160, computer 140, or other devices and/or peripherals, according to certain embodiments. Communications block 250 can be configured to provide wireless connectivity in any suitable communication protocol (e.g., radio-frequency (RF), Bluetooth, BLE, infra-red (IR), ZigBee, Z-Wave, Logitech Unifying, or a combination thereof).

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

Certain Embodiments of the Input Device

Figure 3:
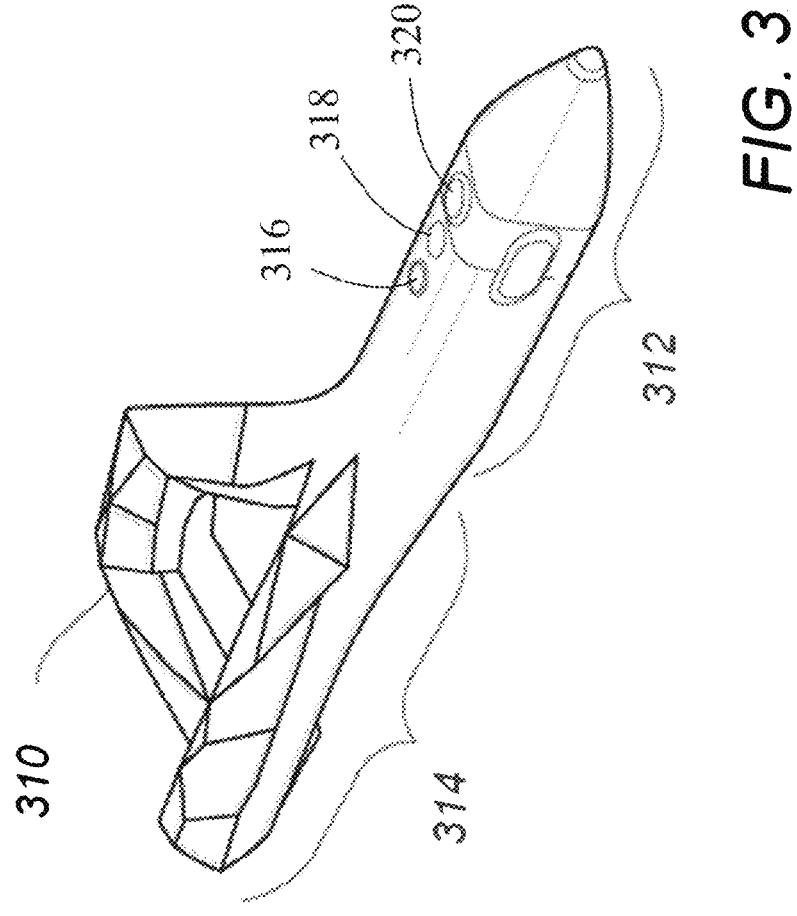
FIG. 3 shows a stylus device configured for operation in an AR/VR environment, according to certain embodiments.

FIG. 3 shows a stylus device ("stylus") 310 configured for operation in an AR/VR environment, according to certain embodiments. Stylus device 310 includes a bottom portion (also referred to as a "front portion") 312 that is typically held by a user while stylus 310 is in use, and a top portion (also referred to as a "back" or "rear portion") 314 with a hexagonal loop geometry configured for excellent tracking properties. Different embodiments can have a plurality of planar facets oriented in different directions, which can include sensors (e.g., IR sensors) and/or emitters (e.g., IR LEDs) disposed thereon to facilitate tracking the position, orientation, and movement of the stylus device in the AR/VR environment. In the embodiment shown, three LEDs 316, 318 and 320 are shown, to allow tracking of the stylus by a VR headset. Alternatively, the LEDs could be on other parts of the stylus. A simple stylus without the hexagonal loop rear portion could be used as well.

Tracking Geometries for Certain Embodiments

To ensure a consistent six degrees-of-freedom in motion for input devices in virtual and augmented reality systems, these devices should be tracked and/or should report their position in three-dimensional space according to a coordinate system of sensors/emitters. To ensure accuracy, the sensors should ideally report unique, non-planar four point references to the system software continuously and through all angles of rotation naturally occurring through the various ranges of motions produced by the user. This range of motion may result from the performance of activities such as, but not limited to: drawing, painting, writing, pointing, etc., in free space while the device is held, for instance, in an opposable thumb pinch grip. The system should be able to recognize the pose, direction and orientation of the device. To prevent occlusion of the sensors, which may occur for instance relative to room-scale system "lighthouses" by the hand holding the form factor, the geometry of the sensor enclosure can be positioned to the rear of the device where it overhangs the user's wrist.

In operation, when the input device is static (not moving), the AR/VR tracking system uses three unique points to deduce the orientation and position of the device. If the system loses "sight" of any of these three points, the tracking may be lost. To ensure consistent tracking while in motion/ rotation the system should be able to continuously recognize four points to enable the transition from one unique set of three points to another.

Docking

When not in use, a user may dock a stylus or other object being tracked in a charger or simply place it in another location. As used herein, the term "dock" can mean placing the stylus or other object being tracked into a docking station or simply placing it in some location, such as a desktop or whiteboard holder for markers. The headset can continue to track the stylus or other object's position, so the user is able to find it again in a VR environment without taking off the headset to see it. However, tracking the stylus while not in use wastes valuable computing resources. Also, most VR systems can only track a handful of devices, and thus tracking the docking station, or even the stylus while not in use, can limit the ability to track other devices. Embodiments of the present invention provide a method and apparatus for detecting when a stylus is docked, remembering the docking location in the headset frame of reference, and turning off stylus tracking while continuing to display the docked stylus. While a stylus is used as an example, other devices could be tracked, such as a controller for the HMD, a gamepad or steering wheel for video games, an audio headset, or earbuds, etc.

Since the docking station is not tracked, embodiments allow its position to be determined. The user could pick up the stylus or controller before putting on the HMD, or could switch the HMD to see-through (augmented reality, AR) to pick up the stylus/controller. In embodiments, when the user puts on the HMD, it will start tracking a controller and a stylus. If the stylus is motionless and in a certain orientation (e.g., vertical or horizontal), the software infers that it is docked, and can render the docking station if it has information about the type of docking station, as discussed below. Then, when the user picks up the stylus and begins using it, the software can continue to display the docking station at the original location of the stylus.

Figure 4B:
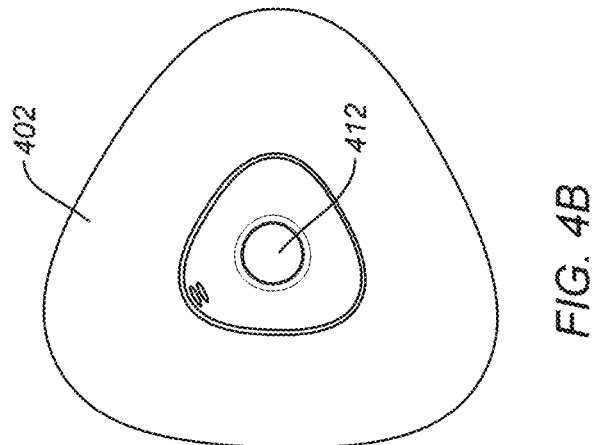
FIGS. 4A-B are perspective and top views of a stylus docking station, according to certain embodiments.
Figure 4A:
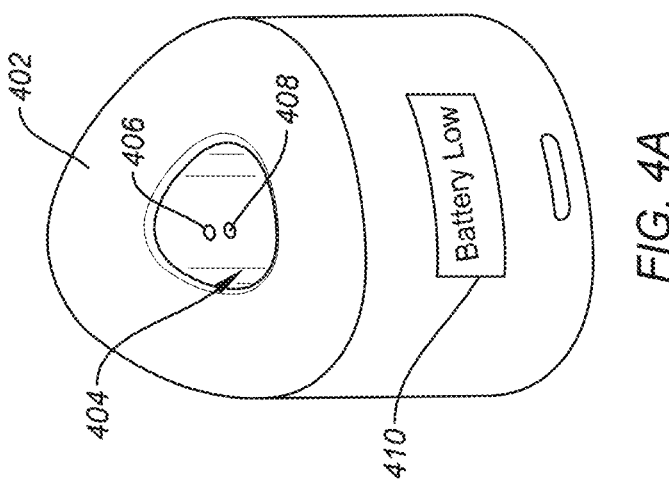

FIGS. 4A-B are perspective and top views of a stylus docking station, according to certain embodiments. FIG. 4A is a perspective view of a stylus docking station 402 with a cavity 404 for the tip of the stylus. Contacts 406 and 408 can be electrical charging contacts for recharging the stylus battery. When the stylus detects charge coming in, it knows it is docked, and can send a message to the headset. In some embodiments, the LEDs on the stylus can blink in a certain pattern to indicate charging, which means it is docked. The headset can then remember the location, maintain a virtual image of the stylus at that location, and stop doing the processing to track the stylus position.

FIG. 4B shows a top view of the docking station 402. The tip of the stylus will contact a contact 412 in some embodiments, providing an alternate charging method. Alternately, the docking station can charge the stylus through induction, without an electrical contact.

In an alternate embodiment, the tracked device can be determined to be docked when it is motionless for a period of time, or when it is both not moving and in a certain orientation (e.g., vertical or horizontal for a stylus). Additionally, the height of the tracked device off a desktop can be a factor in determining that it is docked. For example, if it is at the height of a docking station off a desktop for several seconds, that would indicate that it is docked. Also, since the human hand usually cannot hold the tracked device perfectly still, the lack of movement can indicate docking. The determination can be done in the HMD or in the tracked device itself, and communicated to the HMD. Alternatively, a combination could be used. For example, the tracked device could have accelerometers or tilt sensors to determine its orientation and movement, and the HMD can track its position relative to a desktop. In alternative embodiments, the user can say that the device is docked, or use hand gestures to indicate that it is docked.

In embodiments, different docking locations could be used, with each changing a characteristic of the stylus or other tracked device. For example, one location may cause the stylus to be a particular color when it is picked up.

In embodiments, the stylus/controller/object remains displayed in the HMD rendering when docked, or it can be removed from the HMD display. The HMD can detect when the user resumes use of the stylus/controller a number of ways. When the user resumes use, the HMD resume tracking. The stylus can send a signal to the HMD when it detects it is being picked up by the user. This could be from a capacitive sensor that detects the user's hand or fingers. It could be actively activated by the user pushing a button on the stylus. An accelerometer or tilt sensor in the stylus could detect movement. Alternately, the HMD could have a camera which monitors the real world and detects that the stylus has moved. Or the user could communicate directly with the HMD using gestures or voice commands.

In embodiments, upon detecting that the stylus/controller has been picked up to resume use, the HMD retries a stored virtual rendering of the stylus for a fully immersive, virtual environment, and places it in the display at the location and orientation indicated by tracking.

Docking Transitions

In embodiments, the docking of a tracked device can trigger a transition. Docking a stylus can cause a virtual rendering of a controller to appear, since it is likely the user will want to pick up the HMD controller after the stylus is docked. The transition could also be a keyboard disappearing or appearing. A whiteboard or drawing pad or other elements used by the stylus could disappear when it is docked. The opposite can occur when the stylus is retrieved from the docking station—the controller can disappear (presumably after being docked), and a whiteboard or drawing pad could appear.

Overlays

In embodiments, the docking with a keyboard or console can cause the reception of information from the keyboard or console. For example, the keys or buttons may have programmable functions that could be conveyed to the stylus. The stylus can then convey that information to the HMD, which can then display the appropriate function on each button of the virtual rendering of the keyboard or console. In an augmented reality environment, a virtual rendering can be superimposed over the actual pass-through image of the keyboard or console.

Determination of Docking Station Characteristics

As shown, the docking station 402 has a unique shape, with a triangular cavity 404 for accepting a triangular tip of a stylus. Thus, by the orientation of the stylus, the headset can know the orientation of the docking station. In other embodiments, other unique shapes can be used so that the docked stylus will show the orientation of the docking station. The headset or headset controller memory can store an image of the docking station for the stylus, and can display a rendering of the docking station in virtual reality along with the display of the stylus in the docking station. Thus, not only can the docked location of the stylus be determined and remembered, but another object in contact with the stylus can also be rendered and remembered.

Communication of Information about the Docking Station, its Environment or Stylus/Controller In addition to the stylus communicating to the headset that it is docked, the stylus can provide other information about itself, or about the docking station or other object it is in contact with. For example, the stylus can communicate its charging status. This could be through the color of the LEDs or a pattern or both, or another communication channel. The headset can then provide a visual indication of that information in the immersive virtual world. For example, a red LED may indicate a low battery, and the headset could convert that into the words "Battery low" and provide a virtual display 410 on the virtual rendering of docking station 402. In one embodiment, the headset stops monitoring the stylus most of the time, but could check for the LEDs of the stylus or other communication method periodically to update the status of the charge of the battery of the stylus.

Information could be communicated to the stylus a number of ways. Pogo pins could hit different contacts on the stylus depending on the type of docking station. By the stylus measuring the resistance through the pogo pin, the docking station model can be determined, with different resistances being used to indicate different models. A single pogo pin can be used with different resistance levels in different cradles, or multiple pogo pins which provide digital values, with a 0 or 1 for each pin. An Analog-to-Digital Converter (ADC) in the stylus or controller can convert the resistance into a digital value. The HMD may then access a memory with sufficient information for a rendering of the particular model. The memory could be in the HMD, or in a local computer or in the cloud.

Thus, when the tracked device comes into physical contact with something else, information can be gleaned about that something else. A stored rendering of a cradle could be displayed, for example, or a fanciful rendering of the cradle (e.g., the stylus being placed in the mouth of a rendered dragon, which emits fire to change the color of the stylus). Alternately, the real object can be displayed, with overlays.

Figure 5:
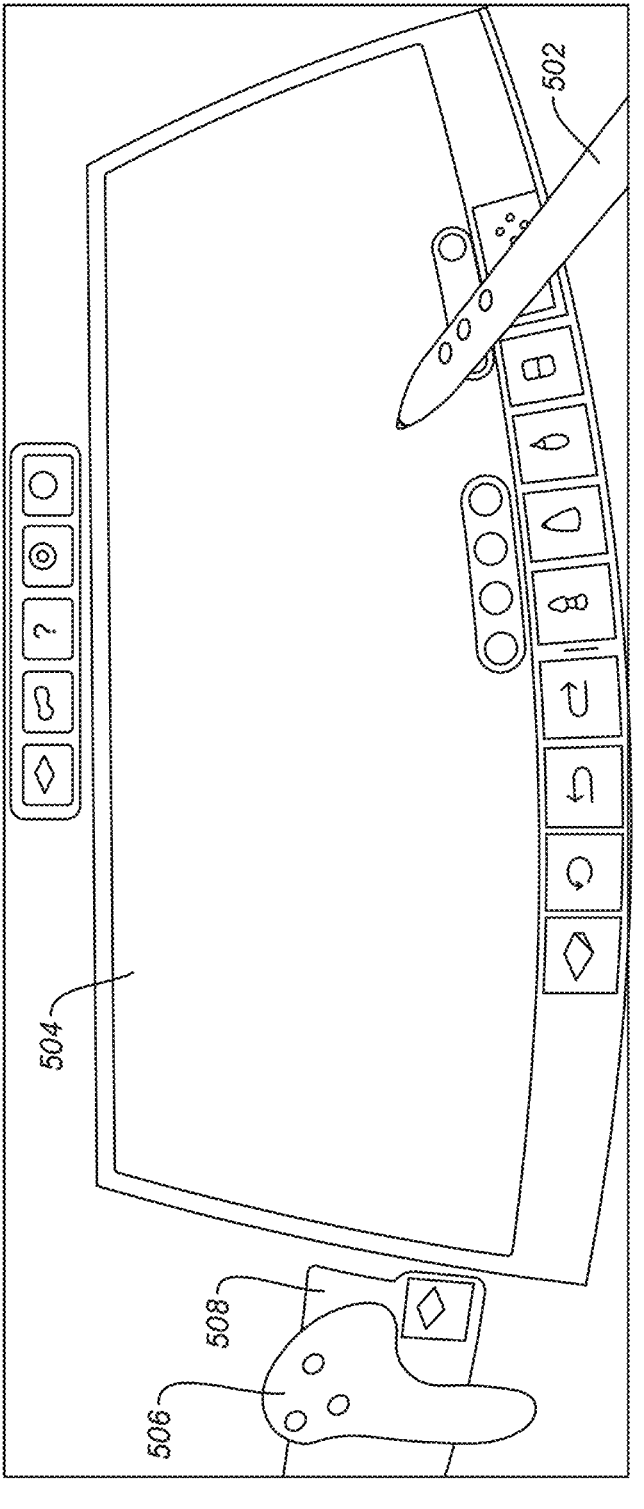
FIG. 5 is a diagram of a virtual rendering of a workspace including a stylus and controller, according to certain embodiments.

FIG. 5 is a diagram of a virtual rendering of a workspace including a stylus and controller, according to certain embodiments. A virtual rendering of a stylus 502 is shown, above a virtual workspace 504. The virtual workspace 504 may be on a physical desktop, so the user can feel the physical stylus on the desktop while performing actions with the virtual stylus 502 on the virtual workspace 504. Also shown is a virtual rendering of a controller 506 in a docking station 508. As used herein, the reference numbers are sometimes used to refer to the virtual rendering, and other times to the corresponding physical device, as will be clear from the context.

Similar to the stylus example discussed above, the position of the controller 506 is tracked, and a determination is made that it is docked. A previously stored image of the docking station is retrieved and is displayed as virtual docking station 508. Subsequently, the headset stops tracking controller 506 and instead just tracks stylus 502, while continuing to display controller 506 and docking station 508, so the user can easily find the controller when it is needed again.

In an alternate embodiment, the storage location, or dock for the stylus or controller can simply be anywhere on a desktop, or anywhere in the real environment. Other possible locations include attaching to a keyboard or tablet, creative console or other computing device or computer peripheral device or other object. The tracked device, when docked, can obtain information from the device it is docked with, and relay that information to the HMD. The communication between the tracked device (e.g., stylus or controller) and the docking device (e.g., charging station, keyboard, tablet) could be by any means, such as near field communication (NFC), Bluetooth® technology, direct electrical connection, magnetic connection, etc. The docking station device can provide sufficient information for the HMD to render a virtual image of the docking station, whether it is a keyboard, tablet, steering wheel, or other peripheral device. When the stylus or controller is picked up again, the HMD can make the keyboard or other docking station disappear, or could maintain its display.

In embodiments, the docking station can also be in communication with other devices, and can relay information about those devices, such as their position and model. For example, a keyboard used as a docking station can be in communication with an associated computer mouse.

In embodiments, the docking station could be attached to a whiteboard (vertical) or a drawing mat (horizontal) on a desktop. The orientation of the stylus in the docking station can inform the orientation of the docking station, such as when the stylus is triangular, and/or when the docking station communicates orientation information to the stylus. If the docking station is attached to the whiteboard or mat in a particular orientation, the orientation of the whiteboard or mat can then be determined.

Figure 6:
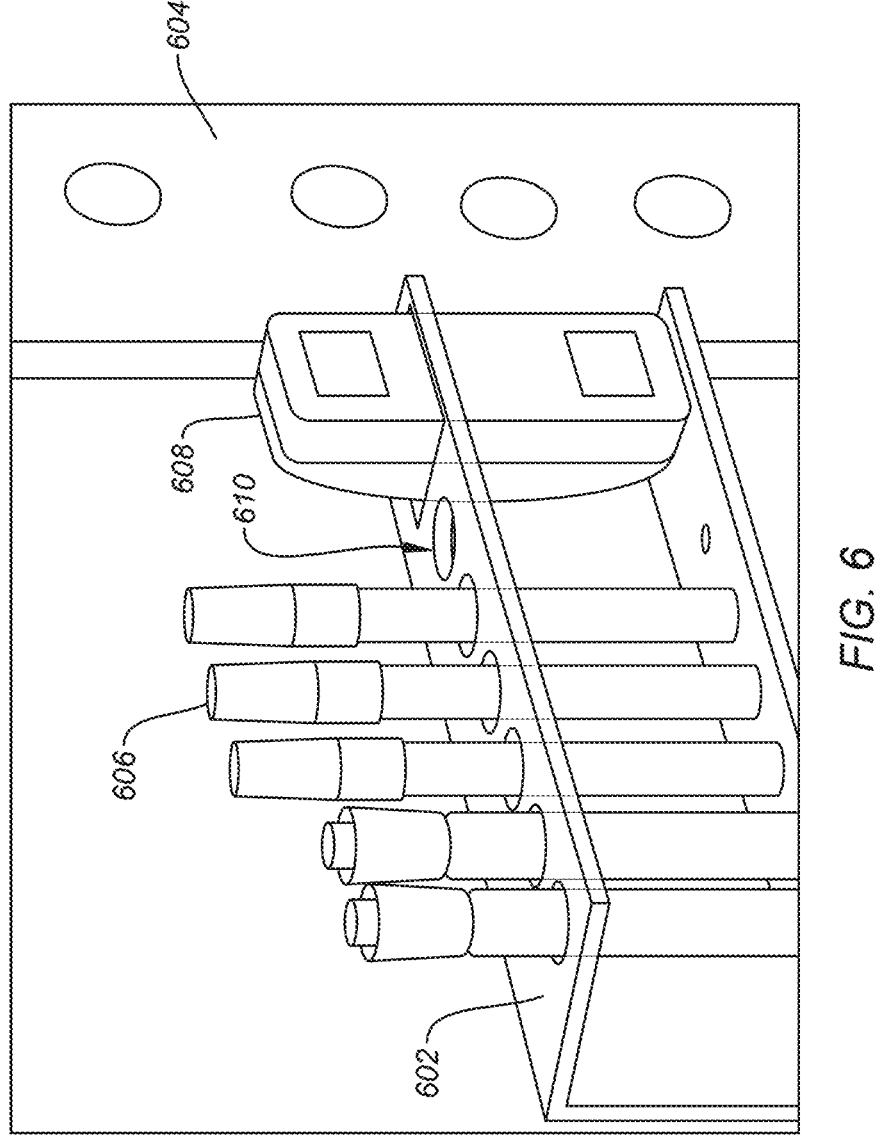
FIG. 6 is a diagram of a plastic docking station for a whiteboard, according to certain embodiments.

FIG. 6 is a diagram of a plastic docking station for a whiteboard, according to certain embodiments. A plastic docking station 602 is mounted adjacent to a whiteboard 604 to hold various devices, such as a marker 606 and a controller 608. The docking station has holes, such as hole 610, shaped to accept different size devices. Docking station 602 could communicate with a docked device to provide information about the docking station or the associated whiteboard 604. For example, it could indicate the size and shape of the whiteboard, along with its distance from the docking station, to allow the HMD to render a virtual representation of the whiteboard in virtual or augmented reality. The communication can be active, using any of the communication means described above (NFC, magnetic, etc.) or passive. An example of passive would be docking a stylus at different angles, with each angle corresponding to a particular whiteboard size and configuration. Other examples of communication include a magnet positioned at different heights along the stylus, with the stylus detecting the position of the magnet, which corresponds to a particular whiteboard size and configuration.

Spatial Anchor Calibration

When the controller or stylus is picked up again, the headset can continue to display the docking station at its location, since it now knows the location of the docking station. In addition, the position of the docking station can be used to correct any drift in the location of spatial anchors in the immersive environment. Spatial anchors mark real world points in a mapped environment. Due to limitations in accuracy these anchors can be imprecise and drift. For example, if you have a spatial anchor for the desk, then the height (Z-axis) of the desk may move up or down by a few mm. It could also move by more if it is a sit-stand desk and the user moves it. The drift of the spatial anchor becomes an issue when you were trying to precisely align a virtual and physical planar surface for writing or sketching. Having the precise location of the stylus when inserted in the dock can be used as a refinement technique to finely adjust the Z-axis position of desk spatial anchors. For example, the software can have stored the height of the docking station above the surface it is on (e.g., the desktop), or simply the height of the stylus LEDs when docked. This height can be used to adjust and recalibrate the height of the representation of the desktop or workspace in the virtual environment.

In one embodiment, the tracked device is a user's hand or fingers, such as for programs using hand gestures for communication. If a tracked finger comes in contact with a key on a keyboard or console, that keyboard or console and send a signal that a certain key has been pressed. Thus, which key which is below the tracked finger is known. If the height of the key is known from the model of the keyboard or console, the height of the desktop is known, and can be used to recalibrate the spatial anchor for the desktop.

In some embodiments, two devices are tracked, for example a stylus and a controller. When the controller is placed on a desktop, but before the stylus is picked up, there will be two tracked points on the desktop. This can be used to calibrate the height of the desktop at two positions, as well as the distance between the stylus and the controller.

Figure 7:
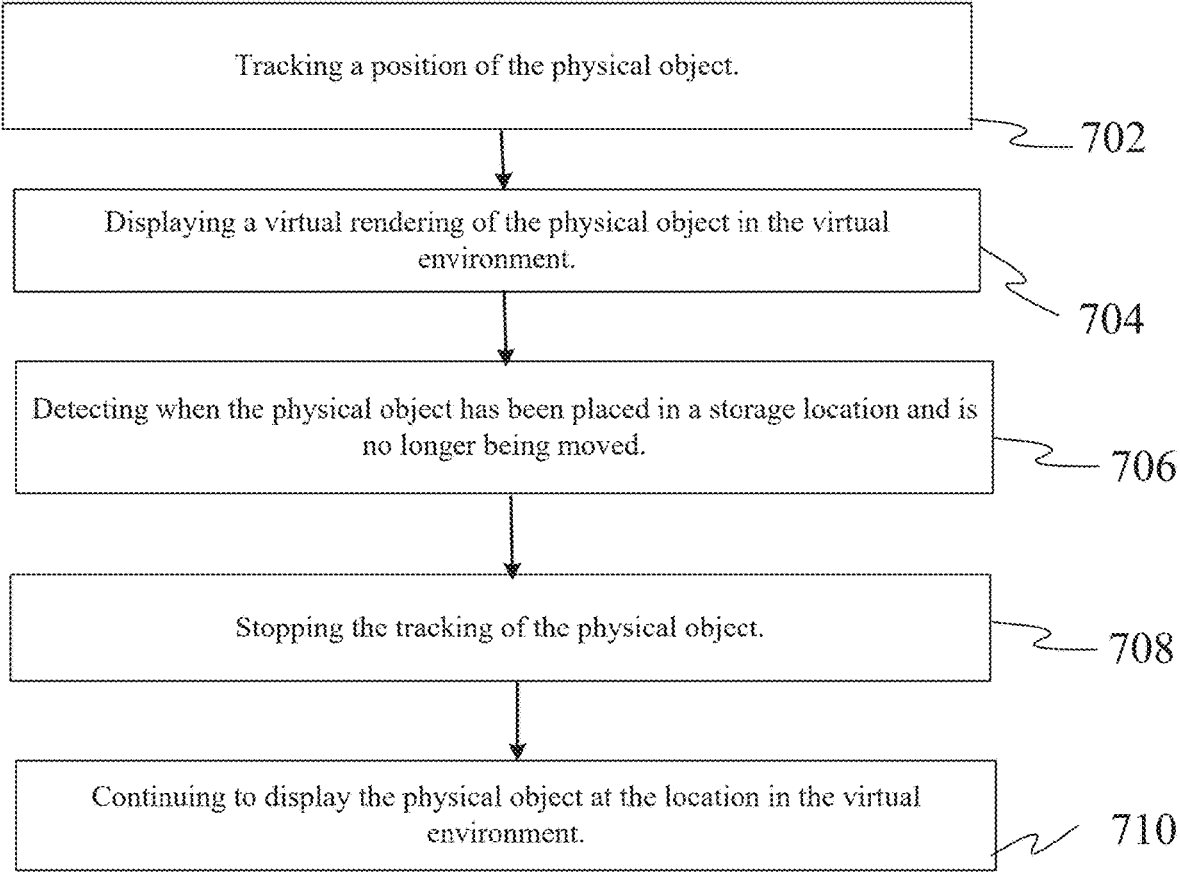
FIG. 7 is a flowchart illustrating a method for tracking a physical object in a virtual environment, according to certain embodiments.

FIG. 7 is a flowchart illustrating a method for tracking a physical object in a virtual environment, according to certain embodiments. Step 702 is tracking a position of the physical object. Step 704 is displaying a virtual rendering of the physical object in the virtual environment. Step 706 is detecting when the physical object has been placed in a storage location and is no longer being moved. Step 708 is stopping the tracking of the physical object. Step 610 is continuing to display the physical object at the location in the virtual environment.

ALTERNATE EMBODIMENTS

One of ordinary skill in the art with the benefit of this disclosure would understand the many variations, modifications, and alternative embodiments thereof. While it may not be expressly stated in each and every embodiment described herein, it should be understood that any features described in one particular embodiment can be applied to any of the embodiments contemplated within this disclosure, and it can be assumed that one of ordinary skill in the art with the benefit of this disclosure would understand how to mix and match said features in any desired combination.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example (s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A method for tracking a physical object in a virtual environment, comprising:

tracking a position of the physical object;

displaying a virtual rendering of the physical object in the virtual environment by a head-mounted display (HMD);

detecting when the physical object has been placed in a storage location and is no longer being moved;

stopping the tracking of the physical object;

providing information about the storage location to the physical object;

transmitting the information from the physical object to the HMD; and continuing to display the physical object at the location within the virtual environment with the HMD based on the information.

2. The method of claim 1 wherein the storage location comprises one of a desktop and a docking station.

3. The method of claim 1 wherein the storage location is a docking station, and further comprising:

storing information about a docking station in a memory; and displaying a rendering of the docking station at the storage location.

4. The method of claim 3 further comprising:

receiving information about a condition of the physical object; and displaying an indicator of the information on the rendering of the docking station.

5. The method of claim 1 wherein the physical object is a peripheral device.

6. The method of claim 5 wherein the peripheral device is one of a stylus and a controller.

7. The method of claim 1 further comprising:

providing a spatial anchor in the virtual environment, the spatial anchor corresponding to the location of a physical element;

linking the storage location to the physical element; and correcting coordinates of the spatial anchor based on the storage location and its link to the physical element.

8. The method of claim 7 wherein the physical element is a desktop.

9. The method of claim 1 further comprising:

detecting a user picking up the physical object; and restarting tracking of the physical object.

10. A method for tracking a peripheral device in a virtual environment, comprising:

tracking a position of the peripheral device;

displaying a virtual rendering of the peripheral device in the virtual environment;

detecting when the peripheral device has been placed in a docking station and is no longer being moved;

storing information about the docking station in a memory;

displaying a rendering of the docking station;

stopping the tracking of the peripheral device;

continuing to display the peripheral device at the docking station in the virtual environment;

detecting a user picking up the peripheral device;

restarting tracking of the peripheral device;

providing a spatial anchor in the virtual environment, the spatial anchor corresponding to a location of the peripheral device;

linking the docking station to the peripheral device; and correcting coordinates of the spatial anchor based on the docking station and its link to the peripheral device.

11. The method of claim 10 wherein the peripheral device is one of a stylus and a controller.

12. The method of claim 10 wherein the physical element is a desktop.

13. A non-transitory computer readable medium having stored thereon software instructions that, when executed by an HID processor, cause the HID processor to execute steps comprising:

tracking a position of a physical object in a virtual environment;

displaying a virtual rendering of the physical object in the virtual environment;

detecting when the physical object has been placed in a storage location and is no longer being moved;

stopping the tracking of the physical object;

continuing to display the physical object at the location in the virtual environment;

receiving information about a condition of the physical object; and displaying an indicator of the information on the rendering of a docking station at the storage location.

14. The non-transitory computer readable medium of claim 13 wherein the storage location is a docking station, and further comprising software instructions that, when executed by the HID processor, cause the HID processor to execute steps comprising:

storing information about the docking station in a memory; and displaying a rendering of the docking station at the storage location.

15. The non-transitory computer readable medium of claim 13 further comprising software instructions that, when executed by the HID processor, cause the HID processor to execute steps comprising:

providing a spatial anchor in the virtual environment, the spatial anchor corresponding to the location of a physical element;

linking the storage location to the physical element; and correcting coordinates of the spatial anchor based on the storage location and its link to the physical element.

16. The non-transitory computer readable medium of claim 13 further comprising software instructions that, when executed by the HID processor, cause the HID processor to execute steps comprising:

receiving information about a condition of the physical object; and displaying an indicator of the information on the rendering of the docking station.

17. The non-transitory computer readable medium of claim 13 wherein the physical object is one of a stylus and a controller.

* * * * *